(No Model.)
W. T. HARRIS.
METALLIC PACKING.
No. 473,313. Patented Apr. 19, 1892.
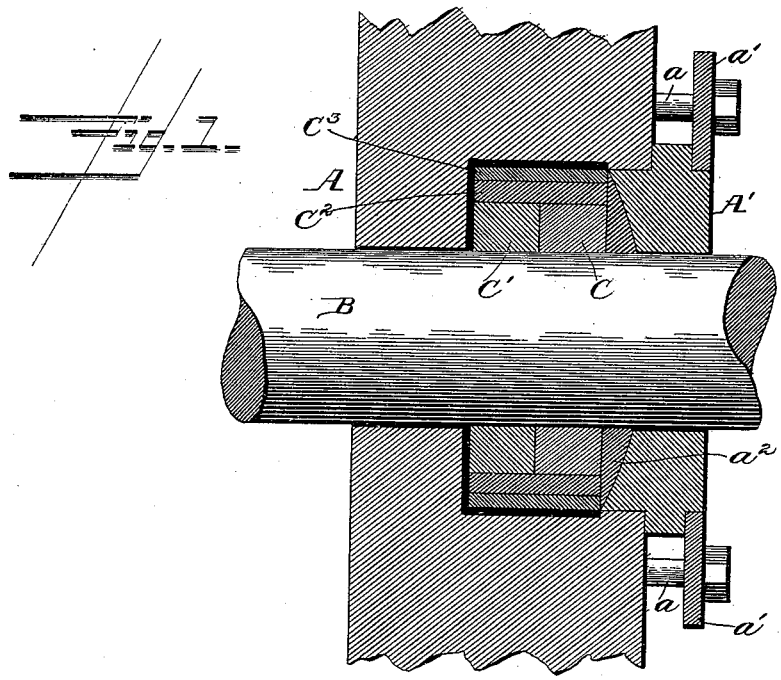
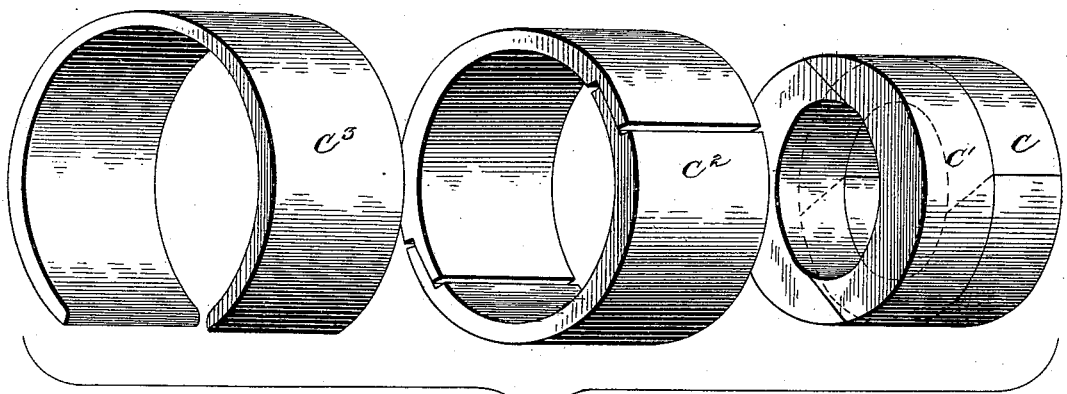
WITNESSES
F. L. Ourand
Jno. Enders Jr.
INVENTOR
William T. Harris
by E. W. Bradford
Attorneys

UNITED STATES PATENT OFFICE.

WILLIAM T. HARRIS, OF BALTIMORE, MARYLAND.

METALLIC PACKING.

SPECIFICATION forming part of Letters Patent No. 473,313, dated April 19, 1892.

Application filed July 31, 1891. Serial No. 401,312. (No model.)

*To all whom it may concern:*

Be it known that I, WILLIAM T. HARRIS, a citizen of the United States, residing at Baltimore, Maryland, have invented certain new and useful Improvements in Metallic Packing; and I do hereby declare the following to be a full, clear, and exact description of the invention, such as will enable others skilled in the art to which it appertains to make and use the same.

My said invention relates to an improved construction of that class of metallic packing for steam-joints which is made up of sectional rings contained in an expansible casing, whereby the construction thereof is simplified and its cost lessened, all as will be hereinafter more fully described and claimed.

Referring to the accompanying drawings, which are made a part hereof and on which similar letters of reference indicate similar parts, Figure 1 is a longitudinal section through the stuffing-box of a valve of a steam-engine, showing my improved packing-ring therein on the piston-rod; and Fig. 2, a perspective view of said ring with its parts separated one from the other, but occupying the same relative positions to each other which they do in use.

In said drawings the portions marked A represent the casing of the stuffing-box; B, the piston-rod, and C, C', $C^2$, and $C^3$ the several rings composing my improved packing. The stuffing-box casing A is of a usual form, with the gland A' secured in its outer end by means of screw-bolts $a$, extending through the ring or flange $a'$ into suitable seats in the main part of the casing. Said gland is formed to fit closely within the opening in said casing, having a shoulder which abuts against the outside surface, thus forming a steam-tight joint when clamped in place by the screws $a$. The chamber in which the packing is mounted is somewhat larger than said packing to permit variations in the angle of the piston rod or shaft, and space is left, as indicated, to allow steam to pass therein, the pressure of which operates to compress said packing upon the rod and force it against the gland. The inner face of said gland A' is formed concave and has a plate $a^2$, formed with its adjacent face convex, mounted therein. The inner face of said plate $a^2$ is straight and true and forms the surface against which the outer end of the packing abuts, being substantially of the size of said end and adapted to cover the joints therein between the rings. The joint between the plate $a^2$ and the gland A' being thus in the nature of a ball-and-socket joint, said plate is permitted to adjust itself to accommodate any angle or vibration of the piston rod or shaft without breaking the close contact between the end of the packing proper and said plate or between said plate and its seat in the gland, thus insuring an effective packing at all times with no joints which can leak under any conditions. The rod B is or may be any piston rod or shaft which passes through a stuffing-box into a steam or other chamber.

The inner rings C and C' of the packing are duplicate in form, and together form in effect a single ring of a width equal to the whole length of the packing. They are preferably made of "Babbitt" metal or similar material and form the face of the packing which engages with the piston rod. Each of said rings is divided into two substantially duplicate parts, with long tapered "slip-joints" between them, the joints of each ring being arranged against a solid portion of the other ring to prevent any leakage. The ring $C^2$ is a plain band of a width substantially equal to the combined width of the two parts C and C' of the inner ring which it surrounds. It is divided transversely into two parts, which are connected by joints formed by cutting into each for substantially half its thickness in opposite directions and fitting the two parts together. The adjacent faces of the projecting ends which fit together to form the joint are formed straight or on tangential lines instead of curved, corresponding to the curvature of the ring. By this arrangement said joints normally hold together and tend to support the sectional rings which this ring surrounds.

The ring $C^3$ is of spring metal and is of size adapted to clamp the ring $C^2$, upon which it is placed, and hold the several parts of the packing securely together. It is formed with one side open to allow the necessary contraction and expansion, said open side being arranged at a point between the joints of the ring $C^2$. It also serves as a casing for the packing and as a seat, upon which the steam-pressure acts to compress the packing.

The operation of my said invention is as follows: The packing being in place with its end tightly fitted against the plate $a^2$, a small amount of steam escapes into the stuffing-box along the piston-rod, and, passing into the space between the outer ring $C^3$ and the casing, operates to compress the packing tightly upon the piston-rod and prevent any steam from passing through the stuffing-box. The steam pressing against the inner end of the packing also operates to force the opposite end tightly against the inner face of the plate $a^2$ and its outer face in turn tightly into its concave seat in the gland $A'$. By this arrangement any escape of steam is prevented and a very simple and inexpensive packing is provided and one which is self-adjustable to accommodate any vibrations or angles of the piston-rod.

Having thus fully described my said invention, what I claim as new, and desire to secure by Letters Patent, is—

1. The combination, with a stuffing-box, of the gland $A'$, formed with a concave seat in its inner face, the plate $a^2$, mounted in said concave seat, its outer face being formed convex to fit therein and its inner face being formed straight, and the packing consisting of the sectional rings $C$ and $C'$, having slip-joints between their sections, the ring $C^2$, surrounding said sectional rings $C$ and $C'$, also divided and connected by sliding joints, and a spring ring or casing $C^3$, surrounding said ring $C^2$, the inner end of said packing being arranged against the adjacent face of the plate $a^2$, which covers the joints in said end of the packing, forming practically a solid end, substantially as shown and described.

2. The combination, with a piston-rod and stuffing-box, of the gland $A'$, formed with the concave seat in its inner face, the plate $a^2$, formed as described, mounted in said concave seat, and the metallic packing mounted on said piston-rod in said stuffing-box, with its end against said plate $a^2$, consisting of the rings $C$ and $C'$, divided and connected by slip-joints, the ring $C^2$, divided and also connected by sliding joints mounted around said rings $C$ and $C'$, and the spring ring or casing $C^3$, surrounding said several parts, substantially as set forth.

In testimony whereof I hereby affix my signature in presence of two witnesses, at Washington, D. C., the 31st day of July, A D. 1891.

WILLIAM T. HARRIS.

Witnesses:
EMMA M. GILLETT,
H. GLENN PHELPS.